United States Patent
Marupaduga et al.

(10) Patent No.: US 10,321,334 B1
(45) Date of Patent: Jun. 11, 2019

(54) METHODS AND SYSTEMS FOR ADJUSTING ANTENNA BEAMFORMING SETTINGS

(71) Applicant: Sprint Communications Company L.P., Overland Park, KS (US)

(72) Inventors: Sreekar Marupaduga, Overland Park, KS (US); Andrew M. Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/875,800

(22) Filed: Jan. 19, 2018

(51) Int. Cl.
| H04W 16/28 | (2009.01) |
| H04W 16/30 | (2009.01) |
| H04W 72/04 | (2009.01) |
| H04B 7/0426 | (2017.01) |
| H04B 7/0491 | (2017.01) |

(52) U.S. Cl.
CPC ............ *H04W 16/28* (2013.01); *H04B 7/043* (2013.01); *H04B 7/0491* (2013.01); *H04W 16/30* (2013.01); *H04W 72/0473* (2013.01)

(58) Field of Classification Search
CPC ..... H04B 7/043; H04B 7/0491; H04W 16/28; H04W 16/30; H04W 72/0473
See application file for complete search history.

(56) References Cited

U.S. PATENT DOCUMENTS

| 5,491,833 | A | * | 2/1996 | Hamabe | ................ | H04W 16/00 455/422.1 |
| 6,011,787 | A | | 1/2000 | Nakano et al. | | |
| 6,453,177 | B1 | | 9/2002 | Wong et al. | | |
| 6,470,195 | B1 | * | 10/2002 | Meyer | ................... | H04B 7/0408 455/562.1 |
| 8,712,403 | B2 | | 8/2014 | Deng et al. | | |
| 9,635,617 | B1 | * | 4/2017 | Marupaduga | ......... | H04W 52/04 |
| 9,668,223 | B2 | | 5/2017 | Abdelmonem et al. | | |
| 2004/0192393 | A1 | * | 9/2004 | Ishihara | ................ | H01Q 1/246 455/562.1 |
| 2004/0203921 | A1 | * | 10/2004 | Bromhead | ............ | H04W 64/00 455/456.1 |
| 2008/0088521 | A1 | | 4/2008 | Le et al. | | |
| 2008/0273515 | A1 | | 11/2008 | Stopler et al. | | |
| 2012/0184280 | A1 | * | 7/2012 | Hunukumbure | ...... | H04W 24/02 455/446 |
| 2013/0273921 | A1 | * | 10/2013 | Kenington | ............ | H04W 16/18 455/446 |
| 2015/0195001 | A1 | * | 7/2015 | Barker | ................. | H04B 7/0413 342/367 |
| 2015/0222025 | A1 | | 8/2015 | Song et al. | | |
| 2015/0318945 | A1 | | 11/2015 | Abdelmonem et al. | | |
| 2016/0066285 | A1 | | 3/2016 | Shoji et al. | | |
| 2016/0192202 | A1 | | 6/2016 | Calin et al. | | |

OTHER PUBLICATIONS

Notice of Allowance dated Jul. 17, 2018 in U.S. Appl. No. 15/847,593, 9 pages.

\* cited by examiner

*Primary Examiner* — Simon Nguyen

(57) ABSTRACT

Systems and methods for adjusting a network signal in a wireless telecommunications network are provided. In aspects, the method can include identifying a broadcast cell having a plurality of TR components. The method can also include determining if a Sector Power Ratio (SPR) of one or more of the TR components is above an SPR threshold value. The method can also include adjusting the power and/or phase supplied to one or more of the TR components to adjust one or more network signal footprints.

20 Claims, 9 Drawing Sheets

METHODS AND SYSTEMS FOR ADJUSTING ANTENNA BEAMFORMING SETTINGS

TECHNICAL FIELD

The present technology relates to adjusting antenna beamforming settings to adjust a network signal footprint.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

In general, the present technology relates to adjusting beamforming settings to adjust a network signal footprint. In aspects, the beamforming settings may be dynamically adjusted, e.g., by adjusting the beamforming settings based on a Sector Power Ratio (SPR) of one or more TR components. In such aspects, adjusting beamforming settings may include adjusting a power supplied to a TR component associated with a broadcast cell in a wireless telecommunications network. In aspects, the power may be adjusted to the TR component to adjust a network signal footprint formed by a network signal emitted by the TR component. In some aspects, the network footprint may be adjusted to reduce intra-cell interference and/or to change an SPR of the network signal footprint. In aspects, based on adjusting the network signal, network performance of some UEs located in the wireless telecommunications network may be increased. In some aspects, this method may be utilized when the broadcast cell has a plurality of TR components that are not maximally spaced apart.

Accordingly, in one aspect, a method for adjusting a network signal in a wireless telecommunications network is provided. The method comprises: identifying a broadcast cell, the broadcast cell comprising a plurality of TR components, each of the plurality of TR components having a distinct azimuthal position; determining that a first sector power ratio (SPR), of a first network signal footprint emitted by a first TR component of the plurality of TR components, is above a SPR threshold value; in response to at least the determining the first SPR is above the SPR threshold value, adjusting a power of the first TR component from a first power setting to a second power setting, wherein the first power setting is associated with the first network signal footprint, and wherein the second power setting is associated with a second network signal footprint having a second SPR, wherein the second SPR is different than the first SPR.

In another aspect, another method for adjusting a network signal in a wireless telecommunications network, the method comprising: identify a broadcast cell, the broadcast cell comprising a plurality of TR components, each of the plurality of TR components having a distinct azimuthal position, wherein the distinct azimuthal positions of the plurality of TR components, when plotted on a polar coordinate system, define at least two polar angles, wherein the at least two polar angles are different from one another; determining that a first sector power ratio (SPR), of a first network signal footprint emitted by a first TR component of the plurality of TR components, is above a SPR threshold value; adjusting a power of the first TR component from a predetermined first power setting associated with the first network signal footprint to a predetermined second power setting associated with a second network signal footprint, wherein the second network signal footprint has a second SPR that is below the SPR threshold value.

In yet another aspect, a system for adjusting a network signal in a wireless telecommunications network, the system comprising: a broadcast cell comprising a plurality of TR components, each of the plurality of TR components having a distinct azimuthal position, wherein the distinct azimuthal positions of the plurality of TR components, when plotted on a polar coordinate system, define at least two polar angles, wherein the at least two polar angles are different from one another; one or more processors; and non-transitory storage media storing computer-useable instructions that, when executed by the one or more processors, cause the one or more processors to: determine a first sector power ratio (SPR) of a first network signal footprint emitted by a first TR component of the plurality of TR components, determine that the first SPR is above a SPR threshold value, and in response to at least the determining the first SPR is above the SPR threshold, adjusting a power of the first TR component from a first power setting to a second power setting, wherein the first power setting is associated with the first network signal footprint, and wherein the second power setting is associated with a second network signal footprint having a second SPR, wherein the second SPR is different than the first SPR.

Additional objects, advantages, and novel features of the technology will be set forth in part in the description which follows, and in part, will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Figure 1:
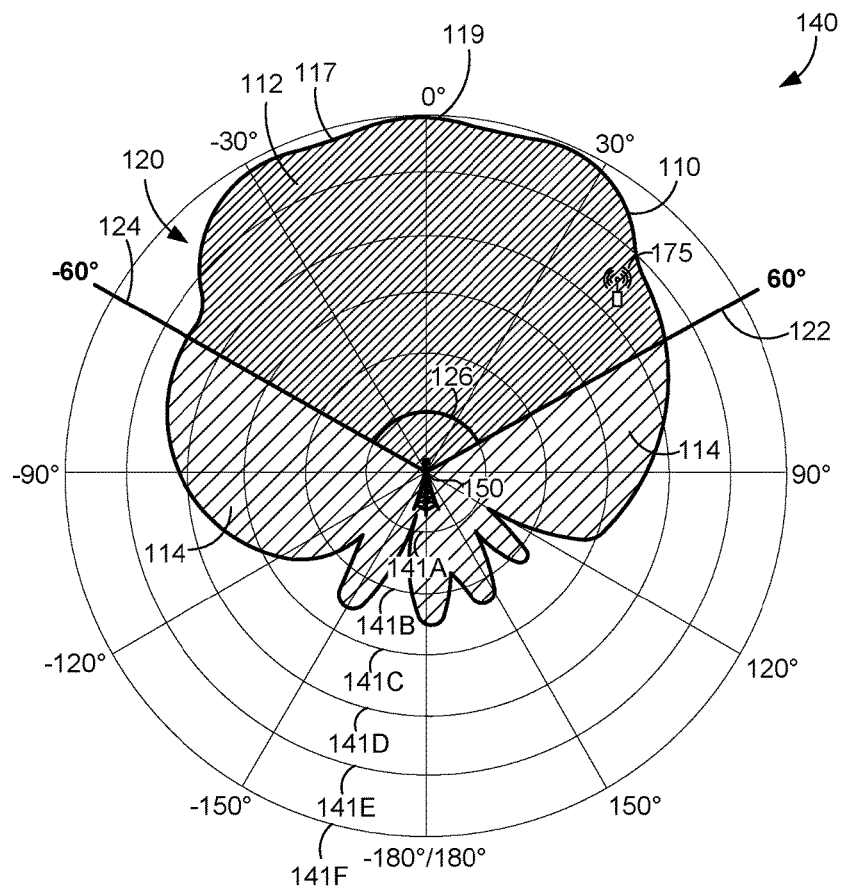
FIG. 1 depicts an example network signal footprint of a wireless telecommunications network plotted on a polar coordinate system, in accordance with aspects described herein.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly described and required.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of the present invention. The following is a list of these acronyms:

CDMA Code Division Multiple Access
 EMS Element Management System
 eNodeB Evolved Node B
 GSM Global System for Mobile Communications
 LTE Long-Term Evolution
 TDMA Time Division Multiple Access
 RF Radio-Frequency
 SINR Signal-to-Interference-Plus-Noise Ratio
 SNR Signal-to-Noise Ratio
 SPR Sector Power Ratio
 TR Transmitting-Receiving
 UE User Equipment Further, various technical terms are used throughout this description. An illustrative resource that fleshes out various aspects of these terms can be found in Newton's Telecom Dictionary, 27th Edition (2012).

In brief and at a high level, the present technology relates to adjusting a network signal in a wireless telecommunications network. For example, in aspects discussed further below, the systems and methods described herein can include adjusting a network signal footprint in order to reduce intra-cell interference, e.g., by adjusting the power and/or phase of a TR component associated with a broadcast cell. Certain current network deployments may utilize beamforming weights that are either set to tapered or full-power and do not take into account either SPR or azimuthal settings. In such systems, where there is high SPR and/or sector overlaps, these current beamforming settings may result in intra-cell interference and/or may impact network performance. For instance, in aspects where the azimuthal settings of a broadcast cell are not maximally spaced apart, these current beamforming settings of tapered or full-power may cause or exacerbate network performance issues due to the intra-cell interference and/or the high SPR values.

The technology described herein alleviates one or more of the above-described problems. For instance, in certain aspects, such as in the event of intra-cell interference, dynamic beamforming settings may be applied to one or more TR components of a broadcast cell in order to reduce the intra-cell interference. In such aspects, dynamic beamforming settings relate to adjusting the power and/or phase of a TR component in order to broaden or taper the network signal footprint, based on the SPR value of the TR component. In various aspects, as discussed further below, the system and methods disclosed herein can identify a broadcast cell where the azimuthal settings of the TR components associated with the broadcast cell are not maximally spaced apart. In such an aspect, if the SPR of one or more of the TR components is above a threshold SPR value, the power of one or more TR components of the broadcast cell may be modified or adjusted to narrow or broaden the network signal beam so as to reduce sector overlap and improve network performance of one or more UEs connected to the broadcast cell. As will be further described below, a relatively high SPR may indicate intra-cell interference within the wireless telecommunications network. In some aspects, adjusting one or more network signal footprints to lower the SPR may reduce intra-cell interference and increase the network performance of UEs in the wireless telecommunications network.

With reference to FIG. 1, an example network signal footprint, network footprint 110, of a wireless telecommunications network is illustrated. In aspects, the network footprint 110 may be an area covered by the network signal in the wireless telecommunications network. In some aspects, the network footprint 110 may cover a portion of the wireless telecommunications network.

In general, a network signal may comprise common signal characteristics, such as channels, frequencies, frequency bands, encoding, and the like. The network signal may be a short-range connection, a long-range connection, or a combination of both a short-range and a long-range wireless telecommunications connection. References to "short" and "long" types of connections are not meant to convey a spatial relationship between two devices. Rather, short range and long range connections should be understood as different categories, or types, of connections (e.g., a primary connection and a secondary connection). A short-range connection may include a Wi-Fi connection to a device (e.g., mobile hotspot) that provides access to a wireless telecommunications network, such as a WLAN connection using 802.11 protocol. A long-range connection may include a connection using one or more of CDMA, GSM, TDMA, LTE, and 802.16. UEs may connect to the wireless telecommunications network through different types of cells. In some aspects, UEs can use femtocells or picocells such that they communicate through a broadband Internet connection such as a digital subscriber line or cable.

In some aspects, the network footprint 110 may generally be considered a radiation pattern of the network signal emitted from a TR component (further described below). The network footprint 110 may include a pattern of lobes or beams over various directions. As can be appreciated, a broadcast cell, such as broadcast cell 150, can emit any number of lobes via the network signal from one or more TR components. For example, a broadcast cell, utilizing one or more TR components, might simultaneously emit a single lobe, six lobes, eight lobes, and so forth. Further, such lobes can be main lobes, side lobes, or the like. In some aspects, the radiation pattern of the network footprint 110 has nodes and peaks, such as node 117 and peak 119 on an outer edge of the network footprint 110. The nodes and peaks (or more generally aspects of the radiation pattern, such as the shape of the radiation pattern) may be determined or adjusted by adjusting the power and/or phase supplied to a TR component emitting the network signal. This may include power patterns supplied to columns of beamforming antenna. As will be understood, the lobes are associated with a radiated signal strength and can be separated by nulls at which the radiated signal strength falls to or near zero. In aggregate, the lobes may cover any range of space up to 360°. For example, in some aspects, the lobes might span 65°, 90°, 180°, or 360° in the horizontal plane.

Referring still to FIG. 1, the network footprint 110 may comprise an area inside a designated coverage zone 120, area 112, and an area outside the designated coverage zone 120, area 114. In some embodiments, the designated coverage zone 120 is represented or defined by an area between two theoretical boundary lines, 122 and 124, and may represent one sector of the broadcast cell. In some aspects, the theoretical boundary lines 122 and 124 may begin at a TR component (not shown) of a broadcast cell 150 and extend away from the TR component. In some aspects, the theoretical boundary lines 122 and 124 are separated by polar angle 126. The TR component and the broadcast cell 150 are further described below with reference to FIGS. 2 and 3. It will be understood that the two theoretical boundary lines 122 and 124 are theoretical in the sense that they have no physical existence and are used only to define boundaries for the designated coverage zone 120. Using FIG. 1, for example, the two theoretical boundary lines 122 and 124 are separated by a 120° polar angle 126, where a first theoretical boundary line 122 is represented at 60° on polar coordinate system 140 and a second theoretical boundary line 124 is represented at −60° on the polar coordinate system 140. As such, FIG. 1 illustrates the designated coverage zone 120 that is between the first theoretical boundary line 122 and the second theoretical boundary line 124, separated by the polar angle 126, which is 120°. The polar angle 126, however, may be larger or smaller than that shown in FIG. 1. For example, polar angle 126 may be defined as 90°, which would make the designated coverage zone 120 smaller. In another example, the polar angle 126 may be defined as 180°, which would make the designated coverage zone 120 larger. In various aspects, the size of a designated coverage zone may be based on the number of TR components associated with a broadcast cell such that a designated coverage zone may be smaller the more TR components that are associated with the broadcast cell, and vice versa.

It will be understood that the polar coordinate system 140 is used to illustrate a geographical area, and that the various segments of the polar coordinate system 140 are used to illustrate and define relative locations or areas within the geographical area. For instance, with reference to FIG. 1, the network footprint 110 is illustrated as covering a relative portion of the geographical area represented by the polar coordinate system 140. The polar coordinate system 140 is shown having a series of concentric circles 141A-141F extending outward from a center, which may be located or defined at or near the broadcast cell 150. In some aspects, the series of concentric circles 141A-141F represents a distance, such as the distance from the broadcast cell 150. In some aspects, the distance may be measured in meters. In some aspects, the distance between each circle of the series of concentric circles may be represented by a power value supplied to the broadcast cell 150 or a TR component of the broadcast cell 150 (such components are further described below), which may be measured in decibels relative to a milliWatt (dBm). For example, the distance from the broadcast cell 150 to circle 141A may be represented by 10 dBm. The distance from circle 141A to circle 141B may also be representative of 10 dbm, and so forth. Then, in this example, the distance from the broadcast cell 150 is to 141B may be represented or described as 20 dBm.

With this in mind, UE 175 may have a location relative to the broadcast cell 150 that may be defined based on dBm. For example, the UE 175 may be considered to be at a distance represented by 40-50 dBm. In general, UEs, such as the UE 175 in FIG. 1, may be any mobile or non-mobile device communicating or having the capacity to communicate with a wireless telecommunications network. In aspects, UEs communicating with the wireless telecommunications network are designated as active state UEs. As used herein, "active state UEs" may generally be referred to as "UEs" for brevity. In various aspects, UEs may make and receive telephone calls over a radio link while moving around wide geographic areas. In addition, UEs may support a wide variety of other services (e.g., text messaging, MMS, e-mail, Internet access, short-range wireless communication, applications, and gaming).

In one or more aspects, a network performance for one or more UEs in the wireless telecommunications network may be determined or measured. Network performance of UEs in the wireless telecommunications network may be measured in several ways. For example, a throughput and/or a signal-to-interference-plus-noise ratio (SINR) for one or more UEs may be measured to determine their network performance. In the most general, relative sense, a higher throughput and a higher SINR indicate better network performance for a UE. Throughput, for example, is a measure of the amount of data that can be transferred to and from (uploaded and downloaded) a UE and the cell network, and is typically expressed as a number of bits per second. As such, a higher number of bits per second is indicative of better UE performance. SINR, for example, is the power of a network signal of interest relative to the sum of an interference power (such as from other network signals or the same network signal emitted from more than one TR component of a broadcast cell) and the power of background noise, often expressed in dB. Thus, a higher SINR indicates better network performance of the UE, as there is less background noise relative to the desired signal. Each of these performance metrics, along with others known in the art (such as signal-to-noise ratio, spectral bandwidth, symbol rate, digital bandwidth, channel utilization, link spectral efficiency, bit-error rate, latency, and the like), may be utilized by this technology and are intended to be a part of this disclosure. Furthermore, a number of UEs in a network or in a particular area of the network may also be measured. These may be measured by components located at the broadcast cell, such as the broadcast cell 150, or by a server and components at a remote location and in communication with the broadcast cell.

Figures 2A, 2B:
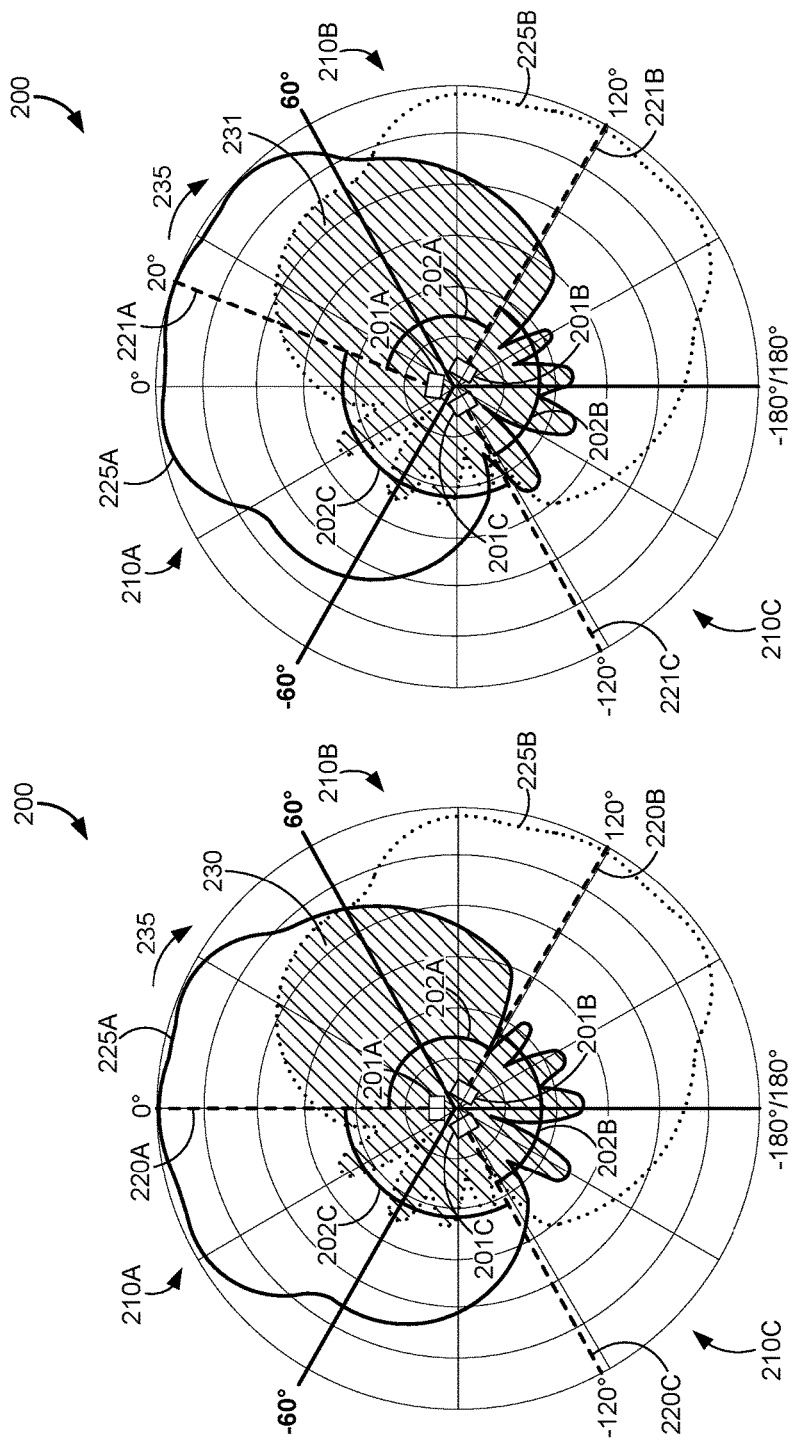
FIGS. 2A and 2B depict example network signal footprints of a wireless telecommunications network plotted on polar coordinate systems, in accordance with aspects described herein.

Turning now to FIGS. 2A and 2B, example network footprints, 225A and 225B, in wireless telecommunications network area 200 are illustrated. In general, FIGS. 2A and 2B are provided to describe example scenarios where TR components are in positions that are considered "maximally spaced apart" (for example, FIG. 2A) and where TR components are in positions that are "not maximally spaced apart" (for example, FIG. 2B). It should be understood that as discussed herein the position and spacing of TR components, and whether or not such components are maximally spaced apart, refers to the position and spacing of the azimuthal positions of the TR components.

FIG. 2A provides one aspect of the wireless telecommunications network 200. In the example illustration of FIG. 2A, the wireless telecommunications network 200 has a broadcast cell (not shown) having three TR components 201A, 201B, and 201C. As will be further explained, the TR components 201A, 201B, and 201C are positioned to be maximally spaced apart. In general, maximally spaced apart is a relative position of a set of TR components of a broadcast cell when the TR components of the set have an equal azimuthal spacing along an azimuthal position 235. For example, FIG. 2A has the three TR components 201A, 201B, and 201C, which are respectively positioned to cover designated coverage zones 210A, 210B, and 210C. Each of the TR components 201A, 201B, and 201C has an azimuthal position or azimuthal setting. For instance, TR component 201A has an azimuthal position 220A. TR component 201B has an azimuthal position 220B. And TR component 201C is shown having an azimuthal position 220C. The TR components 201A, 201B, and 201C are shown maximally spaced apart because their respective azimuthal positions 220A, 220B, and 220C have an equal separation in an azimuthal direction 235. Put another way, the polar angles (polar angles 202A, 202B, and 202C) separating the azimuthal positions 220A, 220B, and 220C are equivalent, shown in FIG. 2A as 120°. For example, with reference to the polar coordinate system of FIG. 2A, the azimuthal position 220A is positioned at 0°, while azimuthal position 220B is positioned at 120°. Thus, polar angle 202A separating azimuthal position 220A and azimuthal position 220B is 120°. Azimuthal position 220C for TR component 201C is shown at −120° on the coordinate system. Thus, polar angle 202B separating azimuthal position 220B and azimuthal position 220C is 120°, and similarly, polar angle 202C separating azimuthal position 220C and azimuthal position 220A is 120°. Thus, each polar angle 202A, 202B, and 202C separating each adjacent TR component of the TR components 201A, 201B, and 201C is 120°, and therefore, the TR components 201A, 201B, and 201C are considered to be maximally spaced apart relative to each other.

As will be appreciated, a maximally spaced distance or polar angle for a set of TR components will vary depending on the number of TR components in the set, which in most aspects will be the number of TR components on one broadcast cell. For example, two TR components in the set will be maximally spaced apart at 180°, while four TR components in a set will be maximally spaced apart at 90°, and so forth. The present technology is not meant to be limited to only these examples; instead, the inventors contemplate that many different arrangements and numbers of TR components are suitable for practicing the technology described herein.

With continued reference to FIG. 2A, as noted above, the TR components 201A, 201B, and 201C are respectively positioned to the cover designated coverage zones 210A, 210B, and 210C. The TR components 201A and 201B are shown emitting a network signal over the network footprints 225A and 225B, respectively. Although the network footprints 225A and 225B are described relative to the TR components 201A and 201B, it will be understood that TR component 201C may have a network footprint as well. However, it has been omitted for the purpose of more easily describing the present technology and to provide clarity within FIGS. 2A and 2B.

In some aspects, the network signal emitted from different TR components, such as the TR component 201A and 201B, may overlap. An illustration of this overlap is shown in FIG. 2A, where the network footprints 225A and 225B have an overlap area 230. UEs in the overlap area 230 may experience a reduced network performance as the overlap area 230 may result in intracell interference. Intracell interference may occur where the network signal emitted from two different TR components on the same broadcast cell have an overlapping coverage area, which can affect the network performance of one or more UEs.

Looking now at FIG. 2B, the example wireless telecommunications network 200 having the designated coverage zones 210A, 210B, and 210C is again illustrated. Here, however, the TR components 201A, 201B, and 201C are not maximally spaced apart. Instead, FIG. 2B illustrates an example where TR component 201A has been shifted by 20° in the azimuthal direction 235. Put another way, FIG. 2B shows the TR component 201A having azimuthal position 221A positioned at 20° on the polar coordinate system. The TR component 201B has an azimuthal position 221B positioned at 120°. Thus, the azimuthal position 221A of the TR component 201A and the azimuthal position 221B of the TR component 201B are separated by polar angle 203A, which is 100°. The TR component 201C has an azimuthal position 221C positioned at −120° on the polar coordinate system. Thus, the azimuthal position 221B of the TR component 201B and the azimuthal position 221C of the TR component 201C are separated by polar angle 203B, which is 120°, while azimuthal position 221C of the TR component 201C and the azimuthal position 221A of the TR component 201A are separated by polar angle 203C, which is 140°. Because the polar angles 203A, 203B, and 203C separating the azimuthal positions 221A, 221B, and 221C are not equal, the TR components 201A, 201B, and 201C are not maximally spaced apart in this example. Put another way, TR components of a broadcast cell may not be maximally spaced apart when each of the TR components has a distinct azimuthal position, and when plotted on a polar coordinate system, the distinct azimuthal positions define at least two polar angles, wherein the at least two polar angles are different from one another.

The network signal emitted by the TR components 201A and 201B of FIG. 2B cover the network footprints 225A and 225B, respectively, and have an overlap area 231 that is larger than the overlap area 230 (in FIG. 2A) because of the shift of the TR component 201A in and the azimuthal direction 235. It will be appreciated that an overlapping area may be larger, smaller, or the same depending on a change in the network footprint, such as a shift in the azimuthal direction 235, of a network signal from a TR component. As mentioned previously, it may be advantageous to reduce the overlapping area to reduce intracell interference experienced by UEs in the overlapping area. As will be discussed in more detail, in some embodiments, a power supplied to the TR component may be adjusted to adjust the network footprint and reduce the overlapping area to reduce intracell interference for the UEs. In some aspects, the network footprint may be adjusted by changing the phase of a signal supplied to the TR component.

Figure 3:
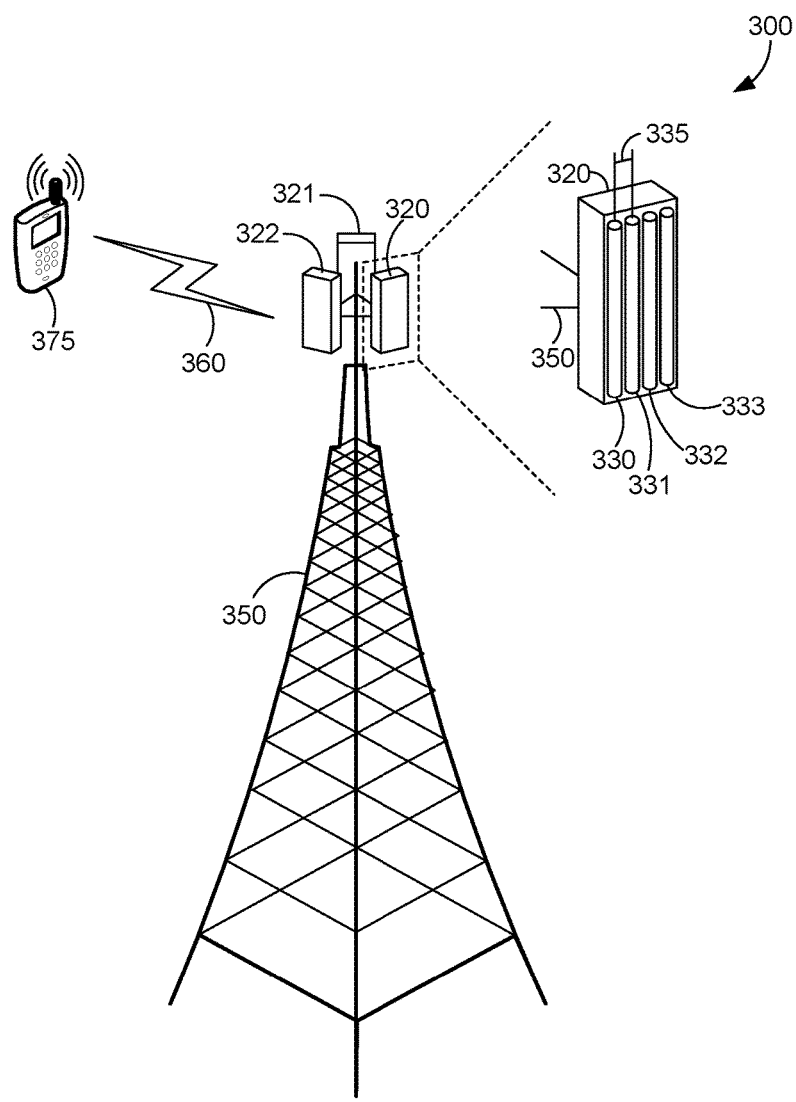
FIG. 3 depicts an example broadcast cell and a close up view of an example TR component, in accordance with aspects described herein.

Turning now to FIG. 3, an example broadcast cell having example TR components is illustrated. FIG. 3 shows an example broadcast cell 350 having a set of example TR components 320, 321, and 322 suitable for use in aspects of the present technology. As used herein, the term "broadcast cell" may include any base station, communication tower, access point, or access node in a network to which a mobile communication device, such as UE 375, may connect to a wireless communication network via a network signal, such as network signal 360. In some instances, depending on the wireless communication technologies employed by the network, a broadcast cell might be referred to as or include a base transceiver station (BTS), a radio base station (RBS), a base station (BS), a node B (in 3G networks), or an eNodeB (in LTE networks), or the like. The broadcast cell 350 of FIG. 3 depicts only a selection of components for clarity and explanatory purposes, and more or fewer components, as well as alternative arrangements of components and/or functionality of components, such as a distributed architecture of components, are possible and contemplated within the scope of this disclosure. Not all arrangements are illustrated for the purposes of brevity and clarity in describing the technology.

As illustrated in FIG. 3, the broadcast cell 350 includes a plurality of TR components 320-322. In some aspects, broadcast cells, such as the broadcast cell 350, may have one or more TR components. It should be recognized that while FIG. 3 is illustrated with the three TR components 320-322, the broadcast cell 350 could comprise any number of TR components, such as two, four, five, six, and so forth. In some aspects, the TR components 320, 321, and/or 322 emit a network signal 360. In some aspects, the network signal 360 may be emitted over a network footprint of coverage area (such as those previous discussed). Also shown in FIG. 3 is UE 375, which may be similar to the UEs previously described. In some aspects, the UE 375 is within a wireless telecommunications network and communicating via the network signal 360.

The example TR component 320 is described in more detail, however, some details of the TR component 320 have been excluded for ease of describing the present technology and because the components not described will be understood by one of ordinary skill in the art. In FIG. 3, the TR component 320 is shown having four TR columns 330-333, which may facilitate emission of a network signal, such as the network signal 360. In some aspects, the TR component 320 is a beamforming antenna, an example of which may be an adaptive array antenna. The TR component 320 is illustrated with the four TR columns 330-333; however, the TR component 320 may have any number of TR columns, including a plurality of TR columns that may be four or eight. In some aspects, the TR columns 330-333 will be polarized, for example, the TR columns 330-333 may be vertically polarized radiating elements. In some aspects, the TR columns 330-333 will be dual-polarized radiating elements. In some aspects, the TR columns 330-333 may be separated by a distance. For example, as illustrated, the TR column 330 is separated from the TR column 331 by a distance 335. In some aspects, the distance 335 may be measured relative to a wavelength of the network signal 360. For example, the distance 335 may be 30% of the wavelength of network signal 360, or 40%, 50%, 60%, and so forth, or any distance between. In some embodiments, the distance 335 may be 50% of the wavelength of the network signal 360.

Figure 4:
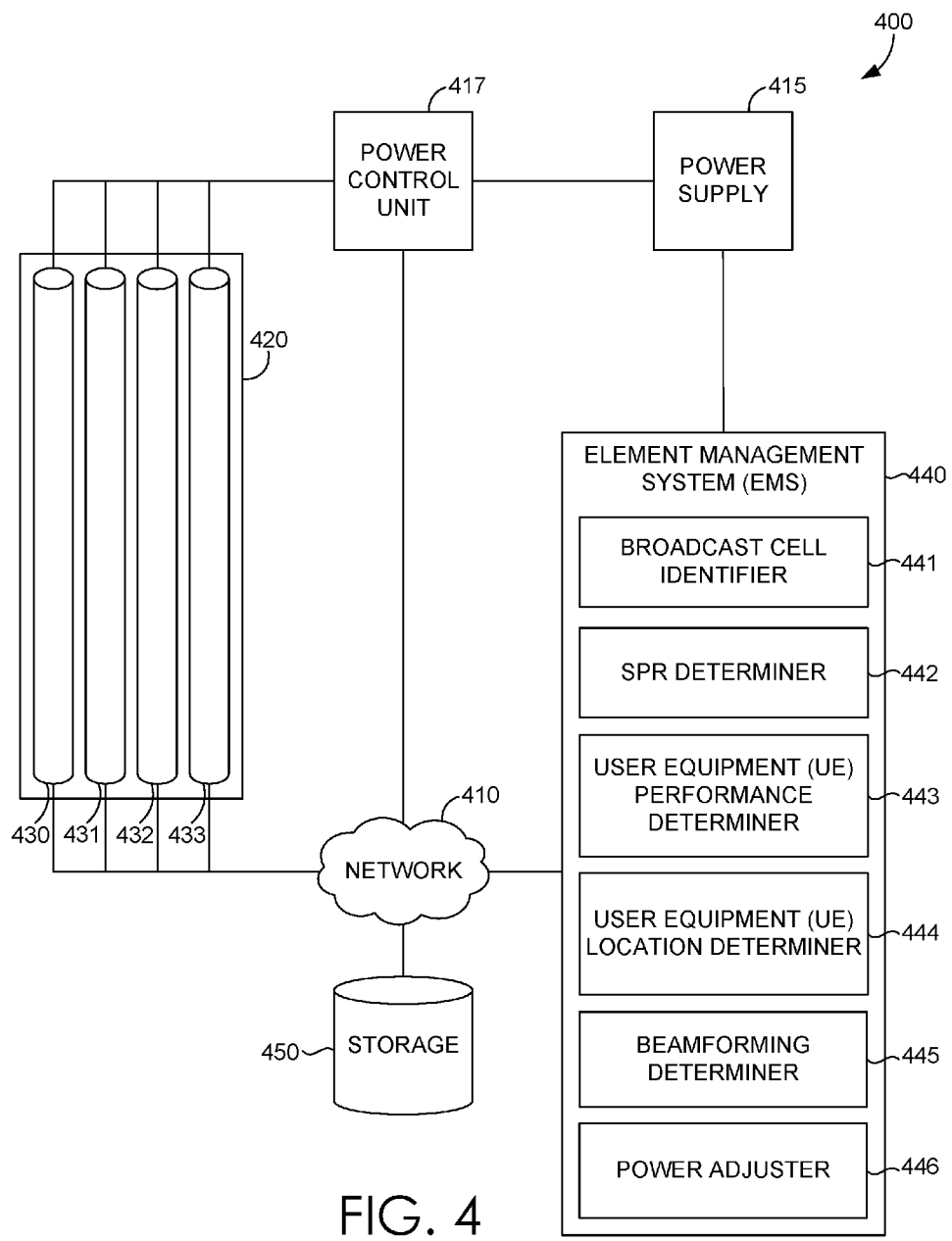
FIG. 4 depicts an example system for adjusting a network signal, in accordance with aspects described herein.

As discussed above, the present technology described herein is directed to adjusting beamforming settings of an antenna or TR component in a dynamic manner, e.g., based on a Sector Power Ratio of a TR component and/or based on intracell interference. FIG. 4 depicts one example operating environment 400 suitable for use in aspects of the present technology is illustrated. The example operating environment 400 of FIG. 4 shows a power supply 415, a power control unit 417, a TR component 420 having a plurality of TR columns 430-433, and an element management system (EMS) 440. The power supply 415 (some aspects of which are also described with respect to an example power supply 626 of FIG. 6), in general, may be any technology for supplying power. For example, this may comprise an external power source, such as a power facility or service that supplies power for a fee. Other sources of power may include batteries, fuel cells, solar cells, and so forth. The power supply 415 may be any suitable source of power for components of the present technology. Other sources of power are considered within the scope of the present technology but are not described herein for simplicity.

In some aspects, the power supply 415 may communicate with the power control unit 417. The power control unit 417 is generally responsible for controlling an amount of power supplied to one or more of the TR columns 430-433. In some aspects, a power supplied to the TR component 420 or the TR columns 430-433 may be adjusted by the power control unit 417 from a first power setting to a second power setting. In some aspects, the power control unit 417 may be an aspect of power supply 415 or may be a separate component as illustrated. In some aspects, power control unit 417 may control the power supplied individually to one or more of TR components 430-433. For example, the power supplied to the TR column 430 may be different than the power supplied to the TR column 431, and so forth. Various combinations of power supplied to the TR columns 430-433 are contemplated. In some aspects, supplying less power to some columns while supplying more to others may be referred to as "tapering," and may result in a "tapered" network signal footprint. In some aspects, a tapered network footprint may cover less area. Such tapering will be further described with respect to FIGS. 5A and 5B. In some aspects, the tapering effect of the network footprint may be achieved by reducing the power to the outer TR columns (such as the TR column 430 and the TR column 433) relative to the inner columns (such as the TR column 431 and the TR column 432). In some aspects, the tapering effect of the network footprint may be achieved by adjusting the phase of a signal received by the one or more of TR components 430-433.

The EMS 440 is also illustrated in FIG. 4, and in general, the EMS 440 determines when and how one or more of the network footprints of a network signal should be adjusted. In some aspects, the EMS 440 may send instructions to the power control unit 417 to control the power or phase supplied to the TR columns 430-433, which in turn may adjust a network footprint. In some aspects, the power control unit 417 may be a function of the EMS 440. As shown, the EMS 440 communicates with the TR columns 430-433 and the power control unit 417 through network 410. Network 410 may include, without limitation, one or more local area networks (LANs) and/or wide area networks (WANs). In example implementations, the network 410 comprises the Internet and/or a cellular network, amongst any of a variety of possible public and/or private networks.

The EMS 440 is further shown in communication with the power supply 415. In some aspects, the EMS 440 may communicate with the power supply 415 through a network, such as the network 410. Again, it will be understood that the arrangement of components will vary. For instance, the EMS 440 may be in direct communication with the TR columns 430-433 and the power control unit 417. In another example, the EMS 440 may be in communication with the power supply 415 by way of the power control unit 417. The arrangement provided by the example operating environment 400 of FIG. 4 is not meant to limit the technology to this particular arrangement, but is only described in this way to provide an example of a suitable system for practicing the technology.

As previously mentioned, the EMS 440 generally determines when and how one or more of the network footprints of a network signal should be adjusted. In some examples, such as that shown in FIG. 4, the EMS 440 has a broadcast cell identifier 441, an SPR determiner 442, a UE performance determiner 443, a UE location determiner 444, a beamforming determiner 445, and a power adjuster 446. It will be recognized by one of ordinary skill in the art that these components may be only some of the components or functions of an EMS, such as EMS 440. In some aspects, practice of the present technology may only utilize one or more of the components shown as part of the EMS 440. Further, it will be also be understood that these functions have been described as being performed by one or more entities, which may be carried out by hardware, firmware, and/or software. It should be understood that this and other arrangements described are only provided as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, some functions may be carried out by a processor executing instructions stored in memory. An example computing device suitable for performing aspects of this technology is provided and further described with respect to FIG. 6.

With continued reference to FIG. 4, the broadcast cell identifier 441 generally identifies a broadcast cell, or TR component of the broadcast cell, within a wireless telecommunications network. In some aspects, the broadcast cell identifier 441 may identify a broadcast cell comprising a plurality of TR components, which in some aspects, each TR component may have a distinct azimuthal position. In some aspects, the broadcast cell identifier 441 may identify a broadcast cell or TR component thereof based on an SPR of a network signal emitted by the TR component. For example, as will be further discussed below, the broadcast cell identifier 441 may identify a broadcast cell or TR component thereof based on the SPR exceeding a threshold value. In some aspects, the broadcast cell identifier 441 may identify a broadcast cell having a plurality of TR components based on the relative azimuthal positions of the TR components. For example, the broadcast cell identifier 441 may identify a broadcast cell based on the TR components being maximally spaced apart. In some aspects, the broadcast cell identifier 441 may identify a broadcast cell based on the TR components not being maximally spaced apart.

In general, the SPR determiner 442 determines the SPR for one or more network footprints of a network signal. As described, the SPR is the ratio of an area of a network footprint that is outside of a designated coverage zone for a TR component to an area of the network footprint that is inside of the designated coverage zone for that TR component.

In some aspects, the SPR determiner 442 determines the network footprint of a network signal emitted by a TR component of a broadcast cell. In some aspects, the SPR determiner 442 will determine a network footprint for each TR component of a set of TR components associated with the broadcast cell. In some aspects, the network footprint may be determined based on information received from UEs in the wireless communication network, by calculating the network footprint based on the power supplied to the TR component, or any other method for determining a network footprint. The SPR determiner 442 may also determine a designated coverage zone for each of the TR components. To determine the designated coverage zone for a TR component, the SPR determiner 442 may reference a predefined designated coverage zone, such as by referencing data storage 450. In some aspects, the designated coverage zone may be received as input from a carrier of the wireless telecommunications network.

Having determined the network footprint for a TR component, and having determined the designated coverage zone for the TR component, the SPR determiner 442 may determine the SPR for a particular network footprint by computing the ratio of the area of the network footprint outside the designated coverage zone to the area inside the designed coverage zone. This calculation may be performed continuously, periodically, or as needed to determine the SPR for a network footprint. It will be appreciated that if the network footprint changes, such as through beamforming or by mechanical adjustment of the TR component, the value of the SPR may change as the ratio changes. Thus, in some aspects, the SPR determiner 442 may determine the SPR for a network footprint before, during, or after a change in the network footprint. In this sense, the SPR determiner 442 may determine the SPR for a first network footprint of a TR component, determine the SPR as the network footprint as it is adjusted, and may determine an SPR for a second network footprint emitted by the TR component after it is adjusted from the first network footprint to the second network footprint.

The UE performance determiner 443, also shown in the example EMS 440 in FIG. 4, generally determines network performance metrics for UEs in a wireless telecommunications network. For example, the UE performance determiner 443 may determine performance metrics, such as throughput and SINR, for active UEs communicating through a network signal. In some aspects, an active UE is a UE that is communicating via the wireless network signal in the communications network. In some aspects, the UE performance determiner 423 determines the performance metrics for active UEs within a particular network footprint. For example, the upload and download speeds of a UE communicating with a broadcast cell through a network signal may be measured to determine throughput for the UE.

Similarly, the UE performance determiner 443 may measure or determine the value of desired signal to the value of background noise for the UE to determine the SINR for UE. While the performance metrics are described here with respect to a single UE, it should be understood that the performance metrics can be measured for a plurality of UEs, including active UEs, communicating through a network signal in the wireless telecommunications network. The performance metrics may be represented as an average for a plurality of UEs, or as a particular measurement for a specific UE. In some aspects, the UE performance determiner 443 determines UE network performance prior to a network signal being adjusted, during adjustment of the network signal, or after the adjustment of the network signal. For example, the UE performance determiner 443 may determine the network performance before, during, and after adjusting a network signal from a first footprint to a second footprint to determine if the network performance of the UE has improved. Put another way, the UE performance determiner 443 may determine the network performance of UEs continuously, periodically, or as needed.

The UE location determiner 444 generally determines the number of UEs and/or the location of UEs within a wireless telecommunications network. In some aspects, the UE location determiner 444 determines the number of UEs in a particular area of a network footprint or, more generally, a particular area of the wireless telecommunications network. In some aspects, the UE location determiner 444 may determine the location of a UE by receiving latitude and longitude information from the UE. In some aspects, the UE location determiner 444 may determine the number of UEs by determining the number of UEs that are communicating with a broadcast cell or one or more TR components thereof. In some aspects, the UE location determiner 444 may determine the number of UEs in the particular area by determining the number of UEs communicating through the network signal with the broadcast cell or a TR component that have a latitude and longitude within the particular area. Other methods known in the art for determining the number and location of UEs in the wireless telecommunications network may be employed and are contemplated within the scope of this disclosure.

The example EMS 440 further includes the beamforming determiner 445, which generally determines the adjustments that should be made to a network footprint. In some aspects, the beamforming determiner 445 may determine the adjustment for one or more network footprints based on an SPR of a network footprint, network performance of UEs in the wireless telecommunications network, or the number and location of UEs in the communications network, which may be respectively determined by the SPR determiner 442, the UE performance determiner 443, and the UE location determiner 444.

The beamforming determiner 445 may determine that adjustments should be made to one or more network footprints emitted by one or more TR components of a broadcast cell based on an SPR value for the one or more network footprints. In some aspects, a high SPR may indicate intra-cell interference and/or lower network performance of some UEs in the wireless telecommunications network. This may be because a high SPR indicates that there is a relatively larger area of the network footprint that is outside a designated coverage. In some aspects, this may indicate a relatively large overlapping area with another network footprint. It may be advantageous to lower the SPR, thereby decreasing the overlap and increasing network performance for some UEs in the network. In some aspects, a higher SPR can result from TR components of a broadcast cell not being maximally spaced apart.

The beamforming determiner 445 may determine that one or more of the network footprints should be adjusted based on an SPR of one or more of the network footprints. In some aspects, the beamforming determiner 445 may determine that one or more network footprints should be adjusted based on the SPR being above a threshold value. In some aspects, the threshold value for the SPR is at or less than of 8%, 10%, 13%, 16%, 20%, 25%, 30%, 35%, and so forth. In some aspects, the beamforming determiner 445 may determine that the network footprint should be adjusted to reduce the SPR of the network footprint below the threshold value.

In some aspects, the beamforming determiner 445 can determine that one or more of the network footprints should be adjusted based on a network performance of a UE in the network or the average network performance of a plurality of UEs in the network. As mentioned above, it may be desirable to adjust the network footprint of the network signal emitted by one or more TR components in order to improve UE network performance. When measured performance metrics exceed threshold values, the beamforming determiner 445 may determine that one or more network footprints should be adjusted to increase network performance of active UEs. For example, the beamforming determiner 445 may determine that one or more network footprints should be adjusted based on an active UE having a throughput below a threshold value for the throughput. In some aspects, the beamforming determiner 445 may determine that one or more network footprints should be adjusted based on an active UE having an SINR below a threshold value for the SINR. In some aspects, a determination that one or more network footprints should be adjusted can be made based on both the throughput being below the throughput threshold value and the SINR below the SINR threshold value. Thresholds may be defined for other performance metrics, and in some aspects, adjustment determinations may be made based on any of the other performance metrics or a combination of any of the performance metrics.

For instance, a threshold value for throughput for a UE may be at or less than: 10 Mbps, 20 Mbps, 25 Mbps, 30 Mbps, 35 Mbps, 40 Mbps, and so forth. In a more general sense, the throughput threshold value may be any predefined threshold by the wireless telecommunications carrier. For instance, as technology improves, the wireless telecommunications carrier may change the throughput threshold to another throughput value. Similarly, threshold values may be defined for a SINR of one or more active UEs. In some aspects, the threshold value for SINR may be at or less than 15 dB. In some aspects the threshold value for the SINR may be at or less than: 20 dB, 25 dB, 30 dB, 35 dB, 40 dB, and so forth. In a more general sense, like the throughput threshold, the SINR threshold may be any threshold predefined by the wireless telecommunications carrier and may be changed in the future as technology improves. As such, the values for the threshold values are not meant to be restricted to those explicitly listed, but rather, the inventors contemplate and include within the scope of this description that any value for the throughput threshold value or the SINR threshold value may be predetermined and used as a threshold value of the performance metrics.

Furthermore, in some aspects, the beamforming determiner 445 determines that one or more of the network footprints should be adjusted based on performance metrics for a plurality of UEs in the wireless telecommunications network, such as in one or more network footprints. The determination to adjust the TR components may be made in order to increase the average network performance for UEs across the wireless telecommunications network or a particular area of the wireless telecommunications network.

In some aspects, the beamforming determiner 445 may determine that one or more network footprints should be adjusted based on the location of one or more UEs in the network. For instance, it may be determined, such as by the UE location determiner 434, that a large number of UEs is in a particular area of the wireless telecommunications network. In some aspects, the larger number of UEs may take priority over areas with fewer UEs. For example, the network carrier may wish to prioritize increasing network performance of UEs in a particular area when there are a relatively large number of UEs in the particular area. In such aspects, it may be beneficial to adjust one or more network footprints so that any overlapping area covering the large number of UEs is reduced or eliminated, e.g., the adjustment may increase average network performance of an area having a higher number of UEs relative to a an area having a lower number of UEs in another part of the network.

In some aspects, the beamforming determiner 445 may determine that one or more network footprints should be adjusted at predetermined times. For example, the beamforming determiner 445 may reference the data storage 450 to determine that a network footprint should be adjusted at a particular predetermined time. In some cases, the predetermined time is determined by a carrier of the wireless telecommunications network and stored on the data storage 450. In some aspects, times for adjusting one or more network footprints may be predetermined based on historical patterns of UE network performance and/or the historical number of active UEs within an area of the wireless telecommunications network. For example, if during the day, certain areas have an increase in UEs during typical business hours and a decrease of UEs after business hours, a predetermined adjustment time may be based on this historical increase or decrease of UEs in the area. In some aspects, a wireless telecommunications carrier may determine times to adjust the TR components and save this information in the data storage 450. For example, a sporting event scheduled for a Sunday afternoon may attract a larger number of people than would normally be located within a given area of a wireless telecommunications network, and as such, there may be an increase in the number of UEs in the area of the sporting event at the time of the event. Thus, the wireless telecommunications carrier may input predetermined times to adjust the network signal in the wireless telecommunications network.

Having determined that one or more network footprints should be adjusted, the beamforming determiner 445 may determine how to form the network footprint, for instance, whether to increase the size/shape of the network footprint or decrease the size/shape of the network footprint. For example, the beamforming determiner 445 may determine that one or more network footprints should broadened, while in some cases, the beamforming determiner 445 may determine that one or more network footprints should be tapered. In some cases, some network footprints may be broadened while others are tapered.

Figures 5A, 5B:
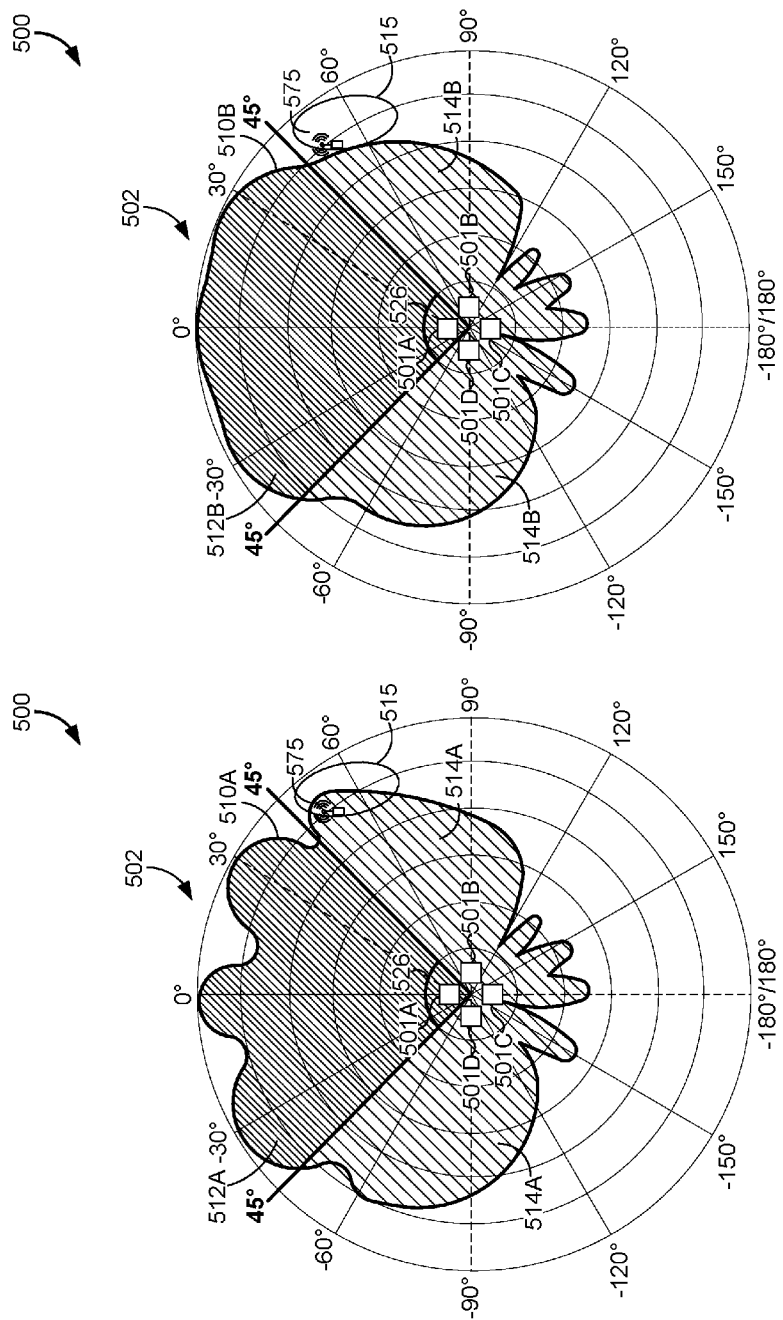
FIGS. 5A-5C depict example network signal footprints of a wireless telecommunications network plotted on a polar coordinate system, in accordance with aspects described herein.

FIGS. 5A and 5B provide two examples of a wireless telecommunications network 500. In the examples provided by FIGS. 5A and 5B, there is a set of four TR components 501A-501D. The set of TR components 501A-501D is not maximally spaced apart, e.g., the polar angles between the azimuthal positions of adjacent TR components are not equal. For example, the azimuthal position of the TR component 501A is at 30°, while the azimuthal position of the TR component 501B is at 90°, the azimuthal position of the TR component 501C is at 180°, and the azimuthal position of the TR component 501D is at −90°.

FIG. 5A illustrates a network footprint 510A formed by a network signal emitted from TR component 501A. The wireless communications network 500 has a designated coverage zone 502. The network footprint 510A has an area inside the designated coverage zone 502, area 512A, and an area outside the designated coverage zone 502, area 514A. The ratio of the area outside the designated coverage zone 502, area 514A, to the area inside the designated coverage zone 502, area 512A, is the SPR for network footprint 510A.

As has been previously described, the beamforming determiner 445 may determine, based on the SPR of the network footprint 510A, to adjust the network footprint 510A to that shown in FIG. 5B, which illustrates a more tapered network footprint 510B. In some aspects, the network footprint 510A is considered broader than the network footprint 510B. In some aspects, a more tapered network footprint may have fewer nodes and peaks on the outer edge of the network footprint. In some aspects, a more tapered network signal may provide a more consistent cell coverage along the outer edge or cell edge of the network footprint.

In some aspects, this may be achieved by adjusting the power and/or phase to selected TR columns of the TR component 501A. In some aspects, this may be achieved by reducing the power to the outer columns of the TR component 501A. In some instances adjusting the network footprint 510A to the network footprint 510B of FIG. 5B, which has an area inside the designated coverage zone 502, area 512B, and an area outside the designated coverage zone 502, area 514B, may reduce the SPR, where the SPR for network footprint 510B is ratio of the area outside the designated coverage zone 502, area 514B, to the area inside the designated coverage zone 502, area 512B. For example, the SPR of the network footprint 510A may be greater than that of the network footprint 510B. This network signal adjustment may improve the network performance of some UEs located in the wireless telecommunications network 500, e.g., by reducing intracell interference. In some instances, UEs located in an overlap area formed by the network footprint 510A and another network footprint, which in some aspects will be formed from the network signal emitted by an adjacent TR component, may improve.

Figure 5C:
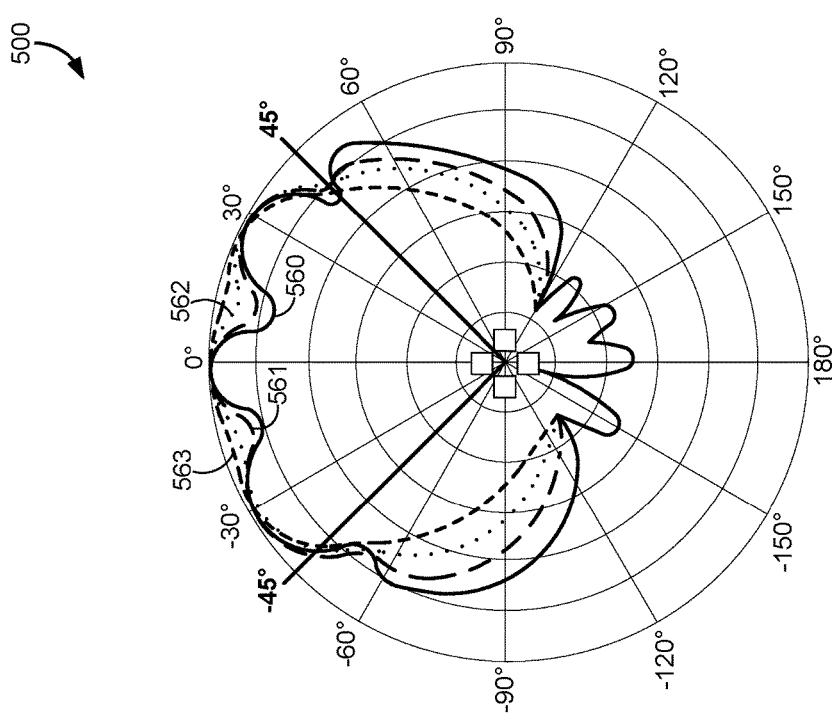

In some aspects, the beamforming determiner 445 may adjust a network footprint to one of multiple possible network footprints. For example, looking at FIG. 5C, network footprint 560 is the most broad and the least tapered network footprint of network footprints 560, 561, 562 and 563, while network footprint 563 is the most tapered and the least broad network footprint of the network footprints 560, 561, 562 and 563. In some aspects, the beamforming determiner 445 may select from a plurality of predetermined weightings to determine how tapered or broad to make the resulting network footprint. For example, the beamforming determiner 445 may select weightings closer to tapered network footprints based on the intra-cell interference being high, for example, if the SPR is high. In some aspects, the beamforming determiner 445 may select weightings closer to full power or broader network footprints based on the intra-cell interference being lower, for example, if SPR is low. It will be understood that the plurality of predetermined weightings may comprise a continuum of weightings between full power (most broad) and tapered, and the beamforming determiner 445 may select any of the weightings along the continuum to adjust the network footprint.

In some aspects, when TR components are not maximally spaced apart and/or an SPR of a network footprint may exceed a threshold value, the beamforming determiner 445 may determine that the network footprint should be adjusted. In some aspects not depicted in the figures, it may determine that a network footprint from an adjacent TR component should be adjusted. And in some aspects, it may determine that both (e.g., two or more adjacent TR components) should be adjusted. For example, in one aspect, it may be advantageous to broaden the network signal from a first TR component, and in order to reduce intra-cell interference caused by the broadening, a network signal from an adjacent second TR component may be tapered. Going with this example, the beamforming determiner 445 may determine that a first network footprint of a network signal emitted from a TR component should be adjusted to a second network footprint that is different than the first. To reduce intra-cell interference caused by an adjacent TR component, the beamforming determiner 445 may determine that a third network footprint formed by the network signal emitted from the adjacent TR component should be adjusted to a fourth network footprint that is different than the third network footprint. In some aspects, the network footprint of the network signal emitted from the adjacent TR component may occur in addition to or in lieu of adjusting the network footprint of the network signal emitted from the TR component.

In some aspects, the beamforming determiner 445 may determine that a network footprint should be adjusted based on network performance and/or location of UEs. For instance, looking at FIG. 5B, UE 575 is not within the network footprint 510B. In some aspects, the UE 575 may also represent a plurality of UEs. The beamforming determiner 445 may determine that the network footprint 510B should be adjusted to form the network footprint 510A, where the UE 575 is located within the network footprint 510A and is now actively communicating with the network signal and/or has an increase in network performance. Using another example, the beamforming determiner 445 may determine that area 515 is not covered by network footprint 510B. The beamforming determiner 445 may determine that the network footprint 510B should be adjusted to form the network footprint 510A, so that all of or at least a portion of the area 515 is covered by the network footprint 510A. In the alternative, the beamforming determiner 445 may determine that the network footprint 510A should be adjusted so as not to cover UE 575 and/or the area 515, so that this area 515 and/or UE 575 may receive network signal from an adjacent TR component that is unencumbered by interference from the network footprint 510A.

In some aspects, the beamforming determiner 445 may determine when and how to adjust one or more network footprints and, for example, may send instructions with this information to the power adjuster 446.

The power adjuster 446 of the EMS 440 is generally responsible for adjusting the power or the phase to the TR columns 430-433 to form the network footprint. In some aspects, the power adjuster 446 may adjust the power in accordance with received instructions from the beamforming determiner 445. As described, varying the power independently in the TR columns 430-433 may change the network footprint emitted by the TR component 420. In some aspects, the power adjuster 446 will adjust the power to the TR columns 430-433 so as to adjust the network footprint in a manner determined by the beamforming determiner 445. For instance, also referring back to FIGS. 5A and 5B, power to the TR columns 430-433 may be adjusted to form the network footprint 510A. In some aspects, the TR columns 430-433 may be adjusted to form the network footprint 510B, which is more tapered with respect to FIG. 5A. It will be understood by one of ordinary skill that the power supplied to the TR columns 430-433 may be adjusted in various ways to achieve the network footprint determined by the beamforming determiner 445.

In some aspects, during and/or after the power adjuster 446 adjusts the network footprint by varying power to the TR components 430-433, the SPR determiner 442 may determine that a second network footprint formed by the adjustment has a lower SPR. In some aspects, it may be determined that the SPR of the second network footprint is below a threshold value for the SPR. Similarly, during and/or after adjusting the network footprint to a second network footprint, network performance of one or more UEs in the network, or in a particular area of the network, may be determined by the UE performance determiner 443 to determine if UE network performance has increased.

Figure 6:
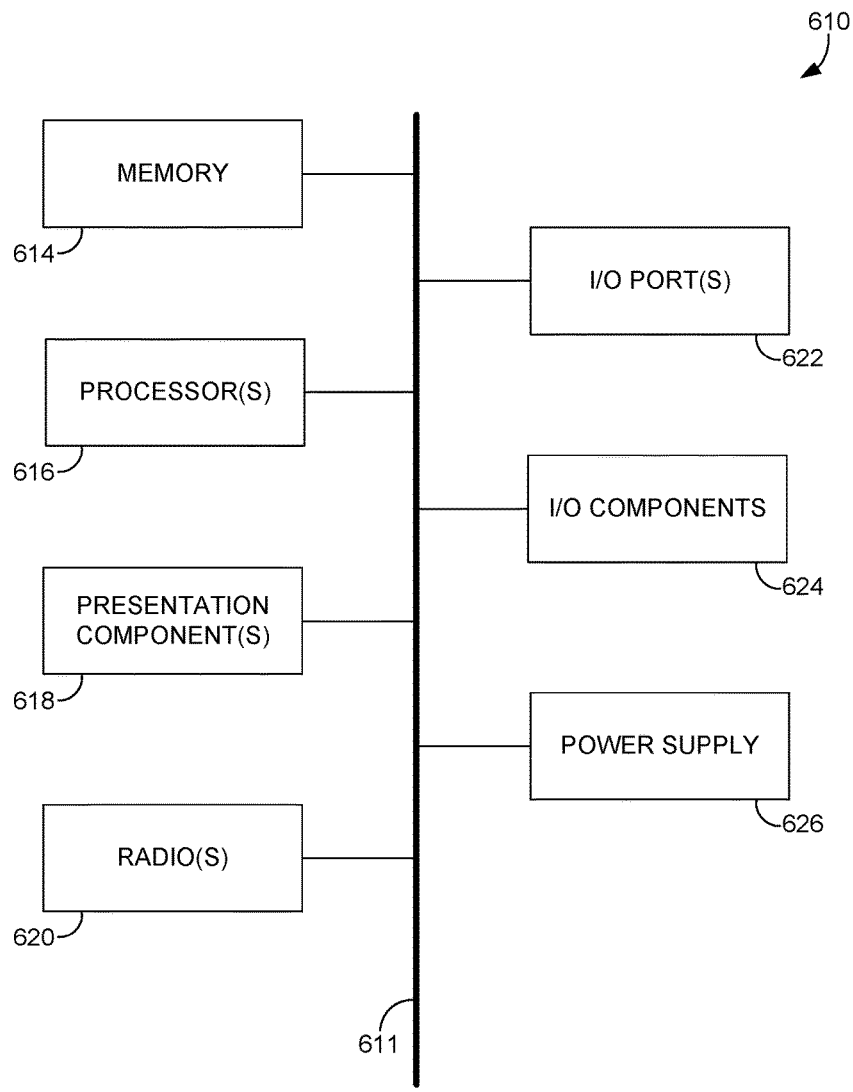
FIG. 6 is an example computing device suitable for use in practicing aspects of the technology described herein.

Referring now to FIG. 6, a block diagram of an example computing device 610 suitable for use in adjusting a network signal in a wireless telecommunications network is provided. It should be noted that although some components in FIG. 6 are shown in the singular, they may be plural. For example, the computing device 610 might include multiple processors or multiple radios. As shown in FIG. 6, the computing device 610 includes a bus 611 that directly or indirectly couples various components together, including memory 614, processor(s) 616, presentation component(s) 618 (if applicable), radio(s) 620, input/output (I/O) port(s) 622, input/output (I/O) component(s) 624, and power supply 626.

The memory 614 may include any type of tangible medium that is capable of storing information, for example a database, such as the data storage 450 of FIG. 4. A database may be any collection of records, data, and/or information. In one embodiment, the memory 614 may include a set of embodied computer-executable instructions that, when executed, facilitate various functions or elements disclosed herein. These embodied instructions will variously be referred to as "instructions" or an "application" for short. The processor 616 may actually be multiple processors that receive instructions and process them accordingly. The presentation component 418 may include a display, a speaker, and/or other components that may present information (e.g., a display, a screen, a lamp (LED), a graphical user interface (GUI), and/or even lighted keyboards) through visual, auditory, and/or other tactile cues.

The radio 620 may facilitate communication with a network, and may additionally or alternatively facilitate other types of wireless telecommunications, such as Wi-Fi, WiMAX, LTE, and/or other VoIP communications. In various embodiments, the radio 620 may be configured to support multiple technologies, and/or multiple radios may be configured and utilized to support multiple technologies.

The input/output (I/O) ports 622 may take a variety of forms. Example I/O ports may include a USB jack, a stereo jack, an infrared port, a firewire port, other proprietary communications ports, and the like. The input/output (I/O) components 624 may comprise keyboards, microphones, speakers, touchscreens, and/or any other item usable to directly or indirectly input data into the computing device 610.

The power supply 626 may include batteries, fuel cells, and/or any other component that may act as a power source to supply power to the computing device 610, to other network components, or to a TR component or components thereof, such as TR columns, and may supply power through one or more electrical connections, couplings, or other suitable electrical hardware or technology. The power supply 626 may be configured to selectively supply power to different components independently and/or concurrently, such as supplying power individually to one or more TR columns of the TR component. In some aspects, the power supply 626 may supply power in accordance with instructions from a power control unit. In some aspects, the power supply 626 may supply a power individually to one or more of the TR columns, while the power control unit may control the amount of power supplied to the TR columns.

Figure 7:
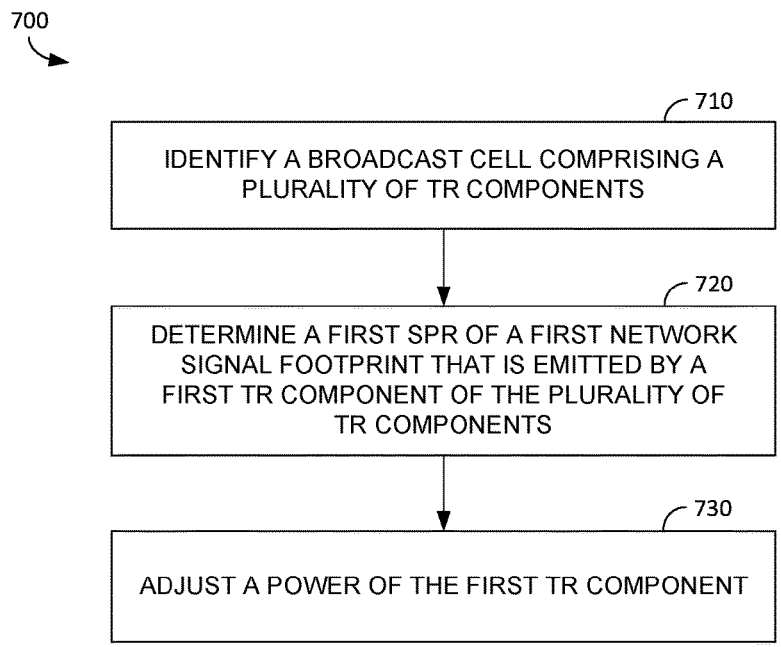
FIG. 7 is block diagram of an example method for adjusting a network signal, in accordance with aspects described herein.

FIG. 7 depicts a block diagram of an example method 700 for adjusting a network signal in a wireless telecommunications network. At block 710, a broadcast cell comprising a plurality of TR components is identified. For example, the broadcast cell may be identified by a broadcast cell identifier. In some aspects, each of the TR components may have a distinct azimuthal position. In some aspects, the distinct azimuthal positions of the plurality of TR components, when plotted on a polar coordinate system, define at least two polar angles, wherein the at least two polar angles are different from one another. In some aspects, the first TR component has a first azimuthal position and a second TR component of the plurality of TR components has a second azimuthal position, while a third TR component of the plurality of TR components has a third azimuthal position. In some aspects, the first, second, and third azimuthal positions are not maximally spaced apart. In some aspects, when the first, second, and third azimuthal positions are plotted on a polar coordinate system, the second azimuthal position is between the first and third azimuthal positions, and a polar angle between the first and second azimuthal positions is less than the polar angle between the second and third azimuthal positions. In some aspects, each TR component of the plurality of TR components is a beamforming antenna.

At block 720, a first SPR of a first network signal footprint that is emitted by a first TR component of the plurality of TR components is determined. In some aspects, it is determined that the first network signal footprint is above a SPR threshold value. In some aspects, the SPR is determined by an SPR determiner. In some aspects, the SPR threshold value is about 8%.

At block 730, a power of the first TR component is adjusted from a first power setting to a second power setting. In some aspects, the first power setting is associated with the first network signal footprint, and wherein the second power setting is associated with a second network signal footprint. In some aspects, the second network signal footprint has a second SPR based on the second power setting. In some cases, the second SPR is different than the first SPR. In some cases, the power is adjusted in response to at least the determining the first SPR is above the SPR threshold.

Figure 8:
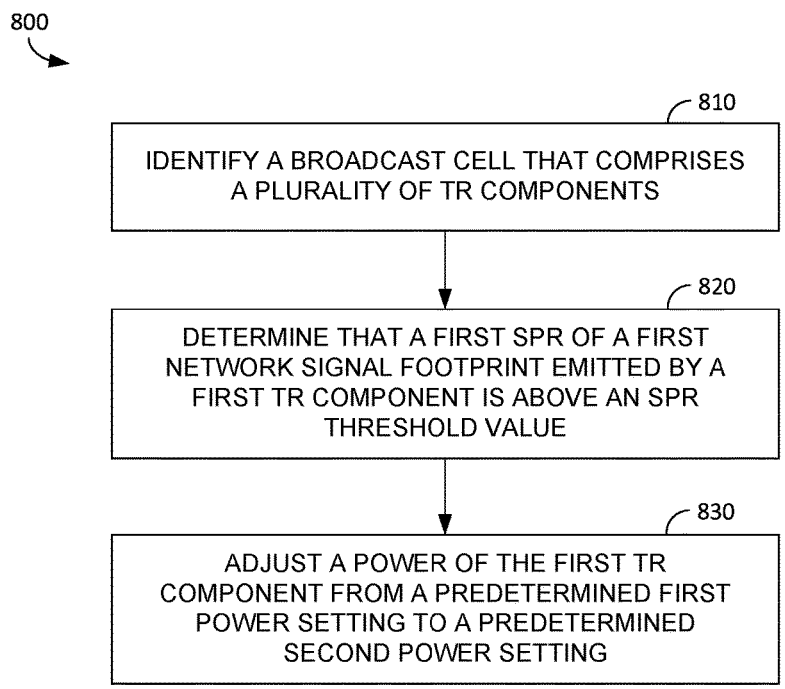
FIG. 8 is a block diagram of another example method for adjusting a network signal, in accordance with aspects herein.

FIG. 8 depicts a block diagram of an example method 800 for adjusting a network signal in a wireless telecommunications network. The method 800 includes a step 810 of identifying a broadcast cell that comprises a plurality of TR components. The distinct azimuthal positions of the TR components, when plotted on a polar coordinate system, define at least two polar angles, where the two polar angles are different than one another. The identification of the broadcast cell can be performed by a broadcast cell identifier, such as the broadcast cell identifier 441 discussed above with reference to FIG. 4.

Step 820 of the method 800, includes determine that a first SPR of a first network signal footprint emitted by a first TR component is above an SPR threshold value. In such an aspect, the SPR determiner 442 discussed above with reference to FIG. 4 may be utilized to determine the SPR of a network signal emitted by a TR component and/or determine if such an SPR is above or below an SPR threshold value.

At step 830, the method 800 includes adjusting the power of the first TR component from a predetermined first power setting associated with the first network signal footprint to a predetermined second power setting associated with a second network signal footprint. The adjustment of the predetermined power setting of the TR component may be determined by one or more components of the EMS 440 discussed above with reference to FIG. 4, such as the beamforming determiner 445 and/or the power adjuster 446. In such aspects, the second network footprint may exhibit a second SPR that is below the SPR threshold value.

From the foregoing, it will be seen that this technology is one well adapted to attain all the ends and objects described above, including other advantages which are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A method for adjusting a network signal in a wireless telecommunications network, the method comprising:
   identifying a broadcast cell, the broadcast cell comprising a plurality of TR components, each of the plurality of TR components having a distinct azimuthal position;
   determining whether a first sector power ratio (SPR), of a first network signal footprint emitted by a first TR component of the plurality of TR components, is above a SPR threshold value;
   in response to determining that the first SPR is above the SPR threshold value, adjusting a power of the first TR component from a first power setting to a second power setting, wherein the first power setting is associated with the first network signal footprint, and wherein the second power setting is associated with a second network signal footprint having a second SPR, wherein the second SPR is different than the first SPR.

2. The method of claim 1, wherein the first TR component has a first azimuthal position, wherein a second TR component of the plurality of TR components has a second azimuthal position, wherein a third TR component of the plurality of TR components has a third azimuthal position, wherein the first, second, and third azimuthal positions are not maximally spaced apart.

3. The method of claim 2, wherein, when the first, second, and third azimuthal positions as plotted on a polar coordinate system, the second azimuthal position is between the first and third azimuthal positions, and wherein a polar angle between the first and second azimuthal positions is less than the polar angle between the second and third azimuthal positions.

4. The method of claim 1, wherein each of the plurality of TR components comprises a beamforming antenna.

5. The method of claim 1, wherein the SPR threshold value is about 8%.

6. The method of claim 1, further comprising determining a network performance of at least one user device connected to the broadcast cell, the network performance comprising a signal-to-interference-plus-noise ratio (SINR).

7. The method of claim 6, further comprising determining whether the SINR of the at least one user device is below a SINR threshold value.

8. The method of claim 7, wherein the SINR threshold value is 20 dB.

9. The method of claim 1, wherein the second SPR is less than the first SPR, and wherein the second SPR is below the SPR threshold value.

10. The method of claim 1, further comprising adjusting a power of a second TR component of the plurality of TR components so that the second TR component shifts from a third network signal footprint having a third SPR to a fourth network signal footprint having a fourth SPR, wherein the fourth network signal footprint and the fourth SPR are different than the third network signal footprint and the third SPR, respectively.

11. The method of claim 10, wherein the second TR component is adjacent to the first TR component on the broadcast cell.

12. A method for adjusting a network signal in a wireless telecommunications network, the method comprising:
   identify a broadcast cell, the broadcast cell comprising a plurality of TR components, each of the plurality of TR components having a distinct azimuthal position, wherein the distinct azimuthal positions of the plurality of TR components, when plotted on a polar coordinate system, define at least two polar angles, wherein the at least two polar angles are different from one another;
   determining that a first sector power ratio (SPR), of a first network signal footprint emitted by a first TR component of the plurality of TR components, is above a SPR threshold value;

adjusting a power of the first TR component from a predetermined first power setting associated with the first network signal footprint to a predetermined second power setting associated with a second network signal footprint, wherein the second network signal footprint has a second SPR that is below the SPR threshold value.

13. The method of claim 12, wherein each of the plurality of TR components comprises a beamforming antenna.

14. The method of claim 12, further comprising determining whether a signal-to-interference-plus-noise ratio (SINR) of at least one user device connected to the broadcast cell is below a SINR threshold value.

15. The method of claim 14, wherein the SINR threshold value is 20 dB.

16. The method of claim 12, wherein the SPR threshold value is about 8%.

17. The method of claim 12, further comprising adjusting a power of a second TR component of the plurality of TR components so that the second TR component shifts from a third network signal footprint having a third SPR to a fourth network signal footprint having a fourth SPR, wherein the fourth network signal footprint and the fourth SPR are different than the third network signal footprint and the third SPR, respectively.

18. A system for adjusting a network signal in a wireless telecommunications network, the system comprising:
a broadcast cell comprising a plurality of TR components, each of the plurality of TR components having a distinct azimuthal position, wherein the distinct azimuthal positions of the plurality of TR components, when plotted on a polar coordinate system, define at least two polar angles, wherein the at least two polar angles are different from one another;
one or more processors; and
non-transitory storage media storing computer-useable instructions that, when executed by the one or more processors, cause the one or more processors to:
determine a first sector power ratio (SPR) of a first network signal footprint emitted by a first TR component of the plurality of TR components,
determine whether the first SPR is above a SPR threshold value, and
in response to determining that the first SPR is above the SPR threshold, adjusting a power of the first TR component from a first power setting to a second power setting, wherein the first power setting is associated with the first network signal footprint, and wherein the second power setting is associated with a second network signal footprint having a second SPR, wherein the second SPR is different than the first SPR.

19. The system of claim 18, wherein the each of the plurality of TR components comprises a beamforming antenna.

20. The system of claim 18, wherein the SPR threshold value is about 8%.

* * * * *